United States Patent [19]

Robert

[11] Patent Number: 5,725,751
[45] Date of Patent: Mar. 10, 1998

[54] PROCESS FOR THE ELECTRO-OXIDATION OF PHOTOGRAPHIC SOLUTIONS

[75] Inventor: Philippe Gerald Robert, Givry, France

[73] Assignee: Eastman Kodak Company, Rochester, N.Y.

[21] Appl. No.: 597,227

[22] Filed: Feb. 6, 1996

[30] Foreign Application Priority Data

Mar. 3, 1995 [FR] France .................... 95 02729

[51] Int. Cl.[6] .................................. C02F 1/461
[52] U.S. Cl. .............. 205/687; 205/688; 205/742; 205/759; 205/760
[58] Field of Search .................... 205/687, 688, 205/742, 759, 760

[56] References Cited

U.S. PATENT DOCUMENTS

| | | |
|---|---|---|
| 3,998,710 | 12/1976 | Itai et al. ................... 204/130 |
| 4,046,655 | 9/1977 | Itai et al. ................... 205/688 |
| 4,985,118 | 1/1991 | Kurematsu et al. ........ 159/47.3 |
| 5,160,417 | 11/1992 | Neale ......................... 204/130 |
| 5,277,775 | 1/1994 | Neale ......................... 204/269 |

*Primary Examiner*—Arun S. Phasge
*Attorney, Agent, or Firm*—John R. Everett

[57] ABSTRACT

The invention concerns a process and a device for the treatment by electrolysis of used photographic solutions containing developers in an electrolytic cell comprising at least one platinum anode. The invention enables the corrosion of the platinum anode to be minimized by using an efficient quantity of antifoaming agent and keeping the pH constant at a value equal to or above 10.5 at the beginning of electrolysis. The invention enables the quantity of platinum coming from the anode in solution to be reduced.

7 Claims, 6 Drawing Sheets

PROCESS FOR THE ELECTRO-OXIDATION OF PHOTOGRAPHIC SOLUTIONS

The invention concerns a process and a device for the treatment by electrolysis of used photographic solutions containing one or more developers in order to break down and eliminate the components having a high chemical oxygen demand (COD). More particularly, the invention concerns the electro-oxidation of developers in an electrolytic cell comprising at least one platinum anode.

PRIOR ART

U.S. Pat. No. 5,160,417 and its divisional application U.S. Pat. No. 5,277,775 describe a system for the treatment of photographic effluents comprising developers, bleaching baths and fixing baths. These three types of effluents are treated in different areas. Example 1 concerns the treatment of effluent containing a developer. This effluent, having been diluted 10 times and the pH adjusted to 10 using soda, is subjected to electrolysis in a cell containing a platinum anode and a stainless steel cathode. Then, by adding barium hydroxide, the sulfate formed is eliminated. The COD falls from 68,000 ppm to 36 ppm, a reduction of 99%. Drawbacks with this method are the need to dilute the effluents and to have an additional step of desulfating after electrolysis.

U.S. Pat. No. 3,998,710 describes a process for the electro-oxidation of photographic effluents comprising a mixture of a developer and at least 10% of fixer from which silver has been recovered. The problems encountered in the electrolysis of these mixtures of developers and fixers are due principally to the presence of ammonium thiosulfate, used as a fixing agent. In this process, electrolysis is carried out with a platinum anode and a stainless steel cathode by adding chloride and carbonate or chloride, carbonate and iodide ions to the solution and at a pH between 4 and 10 by adding soda throughout the electrolysis. If the starting pH is below 4, a large quantity of sulfur forms by oxidation of the thiosulfate contained in the fixer, and there is corrosion of the cathode and generation of chlorine. If the pH is above 10, there is a release of ammonia, and the viscosity of the electrolyte increases, which delays the break-down of the effluent and makes the process difficult, because the fluidity of the electrolyte is lower and numerous bubbles form. This process enables the COD to be reduced by 99% over 20 hours. This process is not applicable to photographic solutions containing only developers.

There are numerous problems and drawbacks associated with the methods of electro-oxidation of photographic effluents comprising a large number of active chemical compounds and having a high COD. A first problem is the corrosion of most of the electrodes during electrolysis. Thus, with platinum-based electrodes, which are those used most frequently, part of the platinum is found in the solutions discharged into the environment. In practice, after electrolysis, the concentration of platinum in solution is high enough for it to be necessary to recover the platinum from the solution by means of post-treatment or continuously, for reasons of cost and in order to limit the concentration of platinum in the effluent.

Another problem associated with the electro-oxidation of photographic effluents is the formation of a copious foam during electrolysis. This problem is particularly serious with effluents having a COD above 20 g/l. This foam is a gas/liquid dispersion which leads to the formation of solid residues which are deposited throughout the apparatus and can render it inoperative. Thus the liquid pollution is changed to solid pollution. One solution is to use an antifoaming product to limit the formation of foam. However, it has been observed that the use of an antifoaming product has, as a secondary effect, an increase in the quantity of platinum in solution of about 50%.

This is why it is desirable to minimize the addition of antifoaming agent in order to limit the quantity of platinum in solution after electrolysis.

DEFINITION OF THE INVENTION

One of the objects of the present invention is thus to minimize the quantity of platinum dissolved during the electro-oxidation of photographic effluents comprising a developer or a mixture of developers in an electrolytic cell comprising at least one platinum anode.

This problem is resolved with the process according to the invention for the electro-oxidation of a photographic solution comprising one or more used developers, a process in which the photographic solution is subjected to electro-oxidation in a single compartment electrolytic cell comprising at least one platinum anode and at least one cathode, characterized in that an efficient quantity of antifoaming agent is introduced into the electrolytic cell and in that, at the beginning of electrolysis, the pH is maintained constant at a value above or equal to 10.5 for 10 to 25% of the total electrolysis time.

Surprisingly, when the electrolysis is started at a constant pH above 10.5, the quantity of foam is lower and the amount of antifoaming agent added can be reduced, thereby reducing the additional quantity of dissolved platinum associated with the presence of the antifoaming agent.

The invention also concerns a complete device, shown in FIG. 1, for the electro-oxidation of a photographic solution comprising one or more used developers, a device comprising (i) a compact electrolytic cell, (ii) means for controlling the pressure, (iii) means for controlling the temperature, (iv) means for eliminating the volatile organic compounds and the volatile halogenated compounds formed during electrolysis, (v) means for recovering the metals in solution, (vi) means for delivering an efficient quantity of antifoaming agent and (vii) means for controlling the pH.

BRIEF DESCRIPTION OF THE FIGURES

In the description that follows, reference will be made to the following figures.

DETAILED DESCRIPTION OF THE INVENTION

The photographic developers in the present invention can be black and white developers, color developers or mixtures of these developers. The developers comprise metol, hydroquinone and phenidone as black and white developing agents, and color developers such as derivatives of p-phenylenediamines or derivatives of phenol or naphthol; additives such as sulfites, bases, formaldehyde, and hydroxylamine salts. The COD of developer baths is very high, ranging from 10 g/l to 100 g/l or even more. Furthermore, some developers used for developing reversal products contain tin.

The present invention also enables the metals coming from the anode (Pt) or from the developers (Sn) to be partly recovered at the cathode.

The electrolysis in the present invention is carried out at a pressure close to atmospheric pressure and at a constant temperature between 20° and 30° C. and preferably close to 25° C.

In contrast with the teaching of U.S. Pat. No. 3,998,710 already cited, electrolysis is carried out at a high pH without a detrimental increase in the viscosity of the electrolyte. Furthermore, surprisingly, the quantity of foam formed is significantly less than if the electrolysis is carried out at a pH around 7 and at a temperature of approximately 25° C.

The antifoaming agents useful in the present invention are bentonite, non-ionic surfactants, such as those in the Pluronic® series, and preferably Pluronic-31R1 Polyol® (a sequential polyethylene oxide and polypropylene oxide copolymer in solution in methanol) marketed by BASF.

In the present application, "efficient quantity of antifoaming agent" is intended to mean the minimum quantity necessary in order to prevent the formation of foam. This quantity varies according to the efficiency of the antifoaming agent and according to its concentration. For example, operating with a pH above 11, a quantity of Pluronic-31R1 Polyol® antifoaming agent used pure below 0.1 ml per liter of effluent to be treated, and preferably below 0.05 ml/l, is used.

Figure 1:
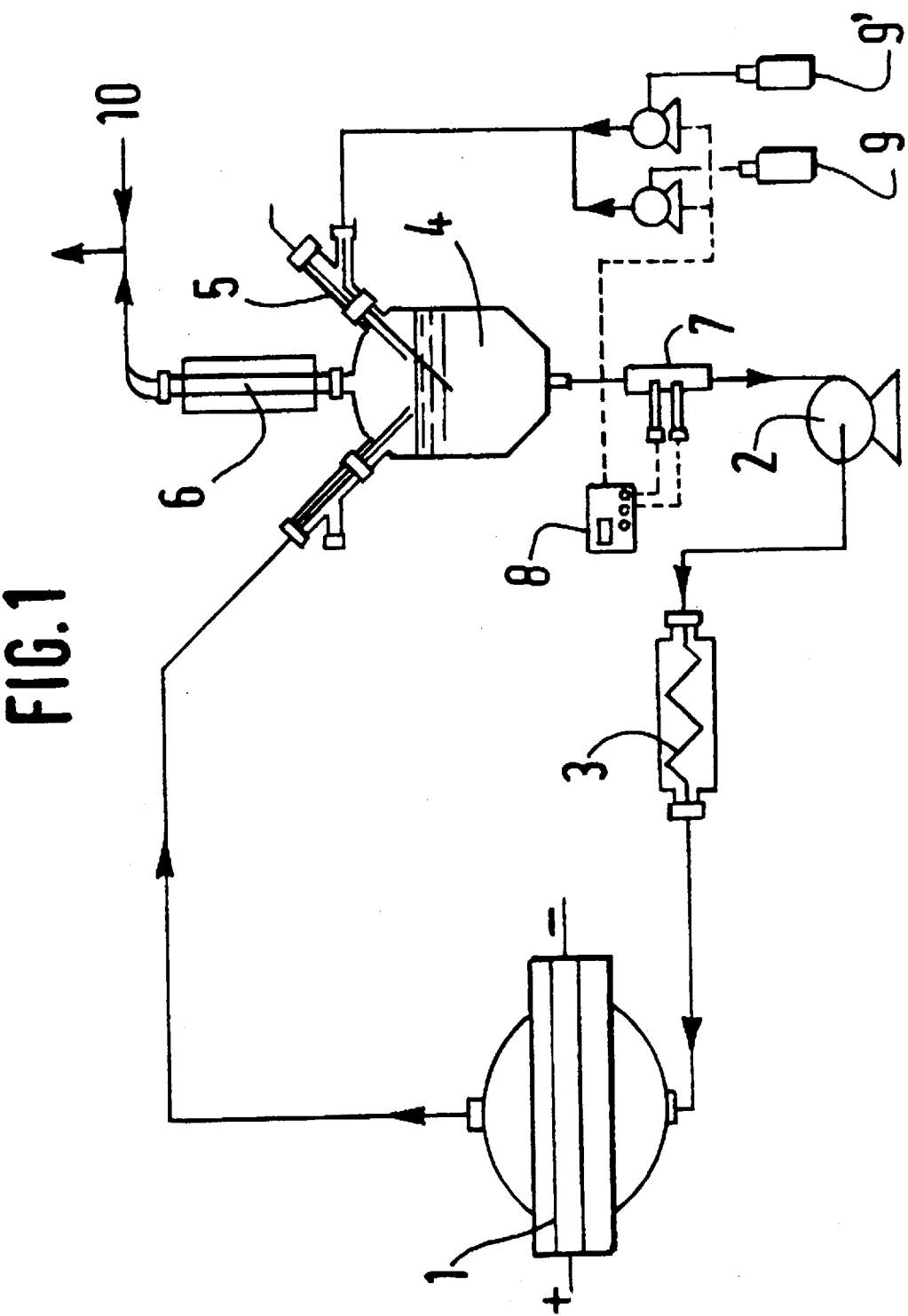
FIG. 1 which represents diagrammatically the device used for the electro-oxidation.

The process and the device according to the invention will be explained on the basis of the embodiment in FIG. 1.

The solution of developers which forms the electrolyte circulates in a closed loop in the installation. The electrolyte initially present in its totality in the expansion vessel (4) is sent to the cooling coil (3) by means of the peristaltic pump (2). It then passes into the electrolytic cell (1), and partly returns in the expansion vessel (4). The electrolytic cell is a closed, single compartment cell, preferably compact, comprising one or more platinum anodes and one or more titanium or stainless steel cathodes, separated by insulating joints. The anodes are SHOWA anodes consisting of titanium coated with pure platinum, which are in the form of plates or expanded metal if the circulation of the electrolyte takes place parallel to the electrodes, and in the form of expanded metal if the circulation of the electrolyte takes place perpendicular to the electrodes.

The expansion vessel is provided with a calibrated orifice which enables a pressure close to atmospheric pressure to be maintained. This vessel serves to even out any variations in the volume of the solution and to expand the gases produced during the treatment (hydrogen, oxygen, carbon dioxide, volatile organic compounds (VOC), halogenated organic compounds (VOX)) to a pressure close to atmospheric pressure, and is used for the continuous addition of reagents. A device (5) enables the temperature in the expansion vessel and in the coil (3) to be measured and regulated.

A pH regulation loop consists of a pH measuring device (7) interposed between the electrolytic cell (1) and the expansion vessel (4), and a regulator (8) which measures any difference from the set value and starts up pumps sending an acid solution (9) or base solution (9') to keep the pH constant.

A peristaltic pump (not shown) enables the antifoaming agent to be introduced into the cell at the start of the electrolysis or as soon as the presence of foam is detected.

At the outlet from the expansion vessel is situated a device (6) for trapping the VOCs and VOXs, such as a cartridge containing an adsorbent substance, for example activated carbon. These gases can also be exposed to ultraviolet radiation, oxidized catalytically or washed over sulfuric acid.

An air inlet (10) enables the gases which present a risk of explosion (hydrogen and oxygen) to be diluted before they are discharged to atmosphere.

Finally, the solution after electrolysis contains further residual quantities of metals coming from the anode or developer, which were not deposited on the cathode. These metals are recovered by passing over a cartridge (not shown) of adsorbents, chelating agents or ion exchange resins situated on the discharge loop of the installation. The preferred materials are Lewatit® TP 214; Duolite® A101, BT73, C467; Amberlite® IRC718, IRA310, IRA400, IRA401, IRA420, IRA458, IRA900, IRA910.

EXAMPLE 1

(invention)

In this example the electrolysis of black and white or color developers is carried out.

In a compact electrolytic cell consisting of SHOWA expanded metal titanium anodes coated with pure platinum and titanium cathodes stacked in alternation, 550 ml of developer coming from the expansion vessel at the rate of 810 ml/min is circulated perpendicular to the electrodes. The current density is 3.33 A/dm$^2$. The electrolysis is performed in galvanostatic mode, the current intensity being set at 10A and the corresponding voltage varying between 6 and 12 volts. The temperature is maintained at 25° C. For a time varying according to the initial COD, the pH is regulated at 11 by adding concentrated nitric acid or soda. 0.03 ml/l of pure Pluronic-31R1 Polyol® antifoaming agent is introduced at the start of electrolysis. The electrolysis is then carried out without pH regulation or addition of antifoaming agent.

The developers subjected to the electro-oxidation are as follows:

C41, a seasoned color developer for the Kodak C41® processing of negative films, for example Kodacolor®.

RA4, a seasoned color developer for the Kodak RA4® processing of Ektacolor® paper.

E6BW, a seasoned black and white adapted for the Kodak E6® processing of Ektachrome® reversal films. E6CD, a seasoned color developer for the Kodak E6® processing of Ektachrome® reversal films. This bath contains 85 mg/l of tin.

R3BW, a seasoned black and white developer for the Kodak R3® processing of Ektrachrome® reversal paper.

R3CD, a seasoned color developer for the Kodak R3® processing of Ektrachrome® reversal paper.

RP-XOMAT®, a seasoned black and white developer for the processing of medical X-ray films.

Figure 2:
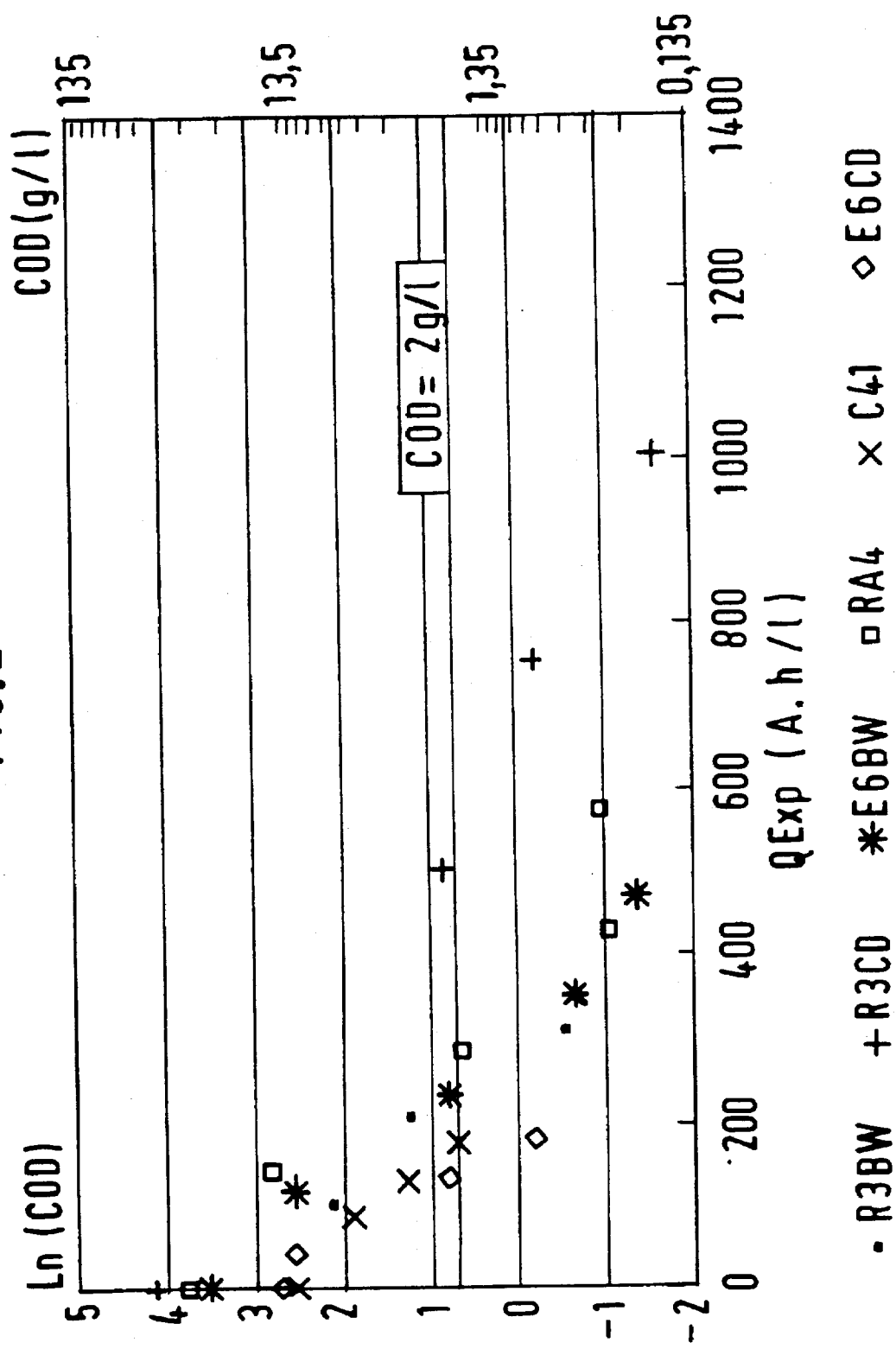
FIG. 2 which represents the lowering of the COD as a function of the quantity of electricity for various developers.

FIG. 2 gives the reduction in the COD expressed as a Napierian logarithm and in g/l as a function of the quantity of electricity supplied for each developer. It can be seen that, in general, in order to obtain a COD of 2 g/l (Ln COD= 0.693), quantities of electricity need to be used which are greater, the higher the initial COD.

Figure 3:
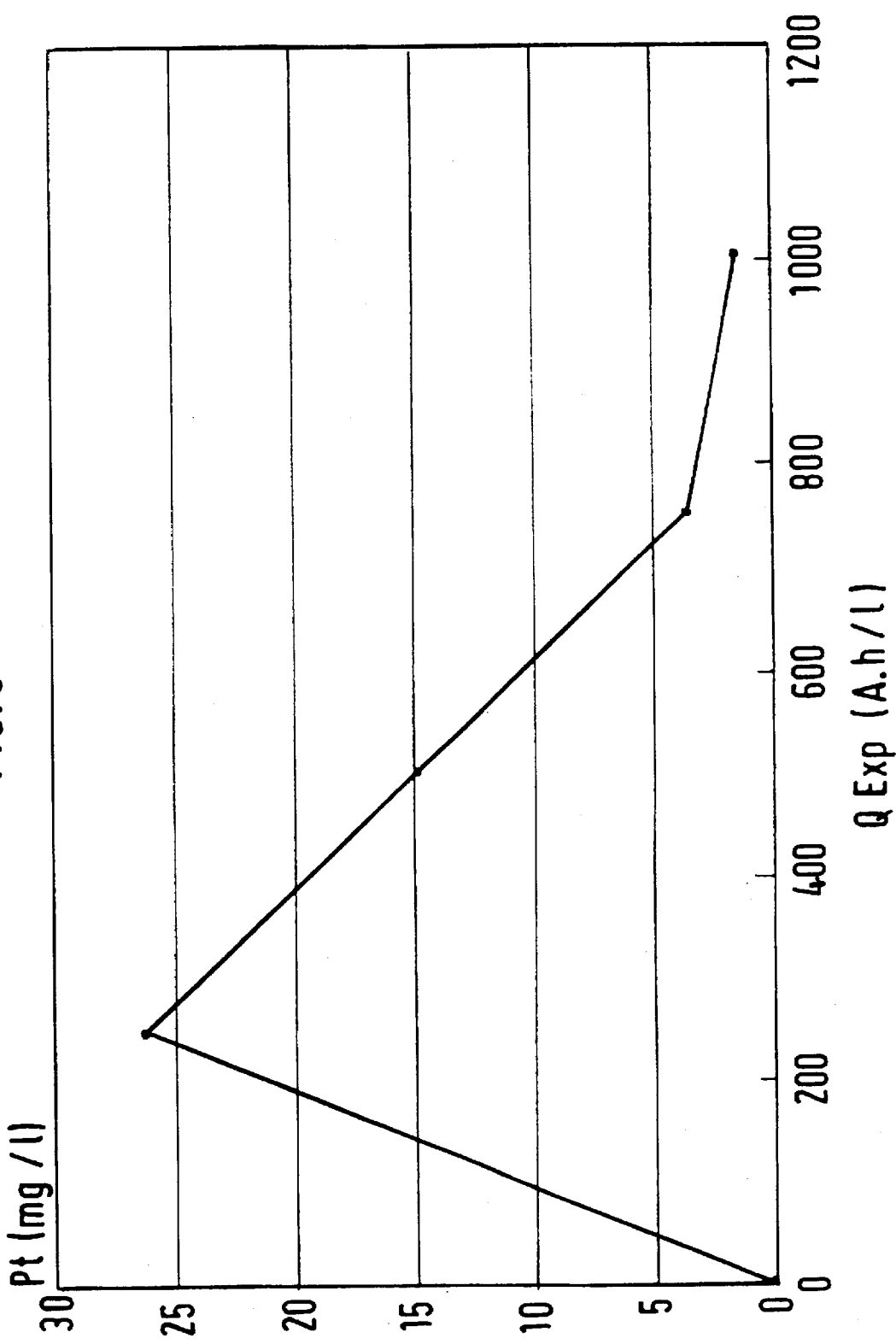
FIG. 3 which represents the concentration of platinum in solution as a function of the quantity of electricity for the developer R3®CD.

FIG. 3 gives the quantity of platinum in solution for the developer R3CD as a function of the quantity of electricity. It can be seen that initially the platinum content of the solution rises, and then falls through the depositing of the platinum on the cathode.

Figure 4:
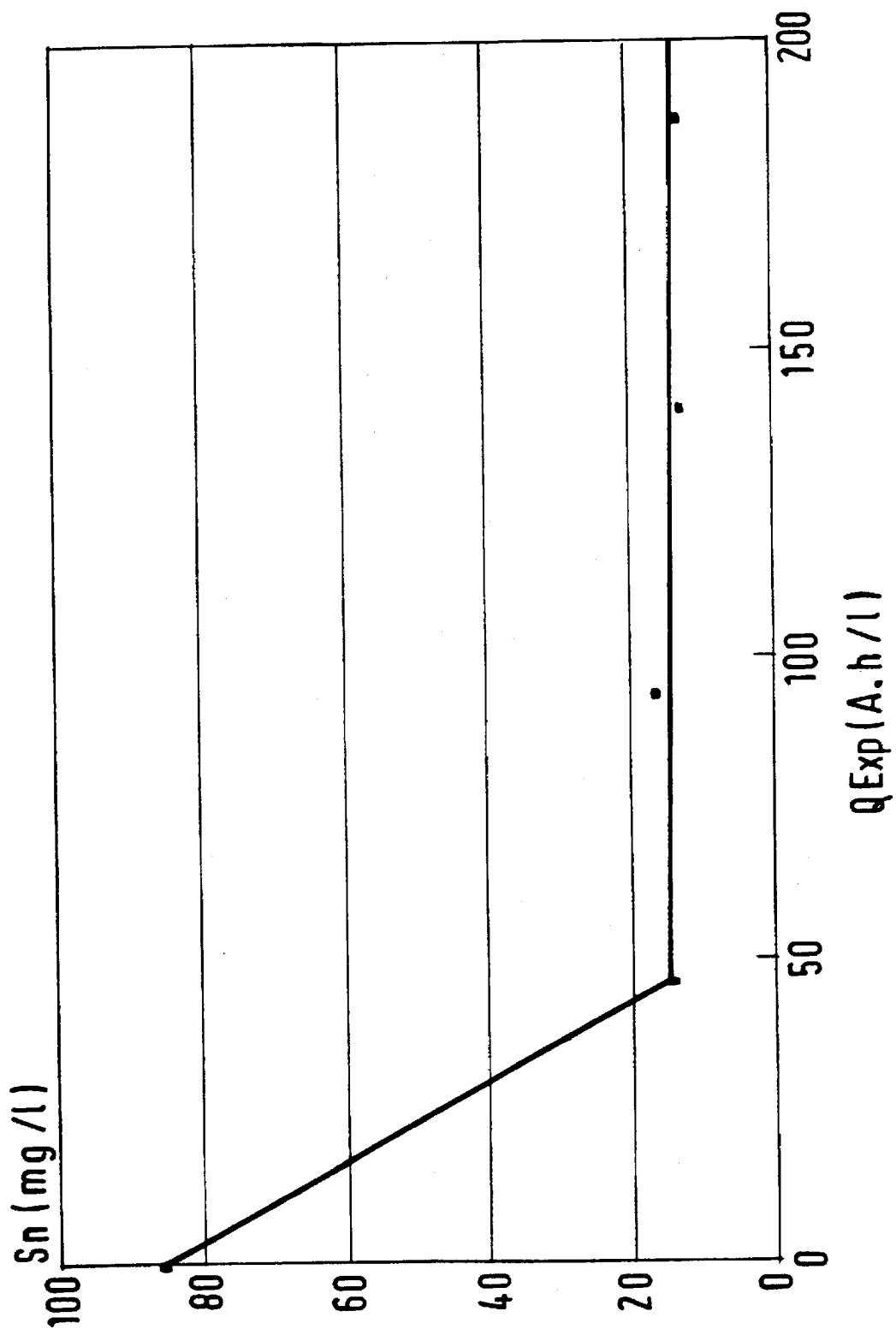
FIG. 4 which represents the concentration of tin in solution as a function of the quantity of electricity for the developer E6®CD.

FIG. 4 gives the quantity of tin in solution for the developer E6CD as a function of the quantity of electricity. It can be seen that 85.3% of the tin initially contained in the developer is extracted.

Table I contains the data relating to the initial COD ($COD_{init}$), the final COD ($COD_{fin}$), the quantity of current consumed in ampere-hours, the time over which the pH is regulated, expressed in hours and as a % of the total duration of the electrolysis, the quantity of platinum and, where applicable, tin which are found in solution after electrolysis.

TABLE I

|          | $COD_{init}$ (g/l) | $COD_{fin}$ (g/l) | Current quantity (A.h) | Reg. pH (h) (% time) | Pt (mg/l) | Sn (mg/l) |
|----------|------|------|-----|----------------|------|------|
| C41      | 13   | 2.0  | 97  | 1.22 (12.5)    | 11.4 | —    |
| RA4      | 43   | 0.4  | 318 | 3.97 (12.5)    | 4.7  | —    |
| E6BW     | 35   | 0.3  | 258 | 3.23 (12.5)    | 8.2  | —    |
| E6CD     | 14   | 0.8  | 103 | 1.25 (12.5)    | 11.5 | 12.5 |
| R3BW     | 31   | 0.4  | 229 | 2.87 (12.5)    | 4.8  | —    |
| R3CD     | 64   | 0.2  | 553 | 5.88 (10.6)    | 1.4  | —    |
| RP-XOMAT | 122  | 1.0  | 907 | 11.34 (12.5)   | 1.8  | —    |

All the solutions obtained are clear and colorless and do not give off any unpleasant odor following treatment.

EXAMPLE 2

(invention)

In this example the electrolysis is effected with mixtures of black and white and dye-coupling developers.

The procedure in Example 1 is repeated, subjecting the following mixtures of developers to electro-oxidation:

Mixture 1: 20 l of C41, 63.9 l of RA4, 9.2 l of E6CD, 18.4 l of E6BW, 6.9 l of R3CD, 4.6 l of R3BW. The mixture contains 14.5 mg/l of Sn.

Mixture 2: 4.1 l of C41, 21.0 l of RA4, 32,11 of E6CD, 64.2 l of E6BW, 42.8 l of R3CD, 28.2 l of R3BW. The mixture contains 13.9 mg/l of Sn.

Mixture 3: 1.3 l of C41, 2.5 l of RA4, 50.5 l of E6CD, 101.0 l of E6BW, 45.7 l of R3CD, 30.2 l of R3BW. The mixture contains 19 mg/l of Sn.

Mixture 4: 60.8 l of C41, 0.0 of RA4, 23.4 l of E6CD, 46.8 l of E6BW, 15.8 l of R3CD, 10.4 l of R3BW. The mixture contains 13.5 mg/l of Sn.

Mixture 5: 2.6 l of C41, 31.8 of RA4, 56.11 of E6CD, 112.2 l of E6BW, 9.5 l of R3CD, 6.3 l of R3BW. The mixture contains 21.8 mg/l of Sn.

Figure 5:
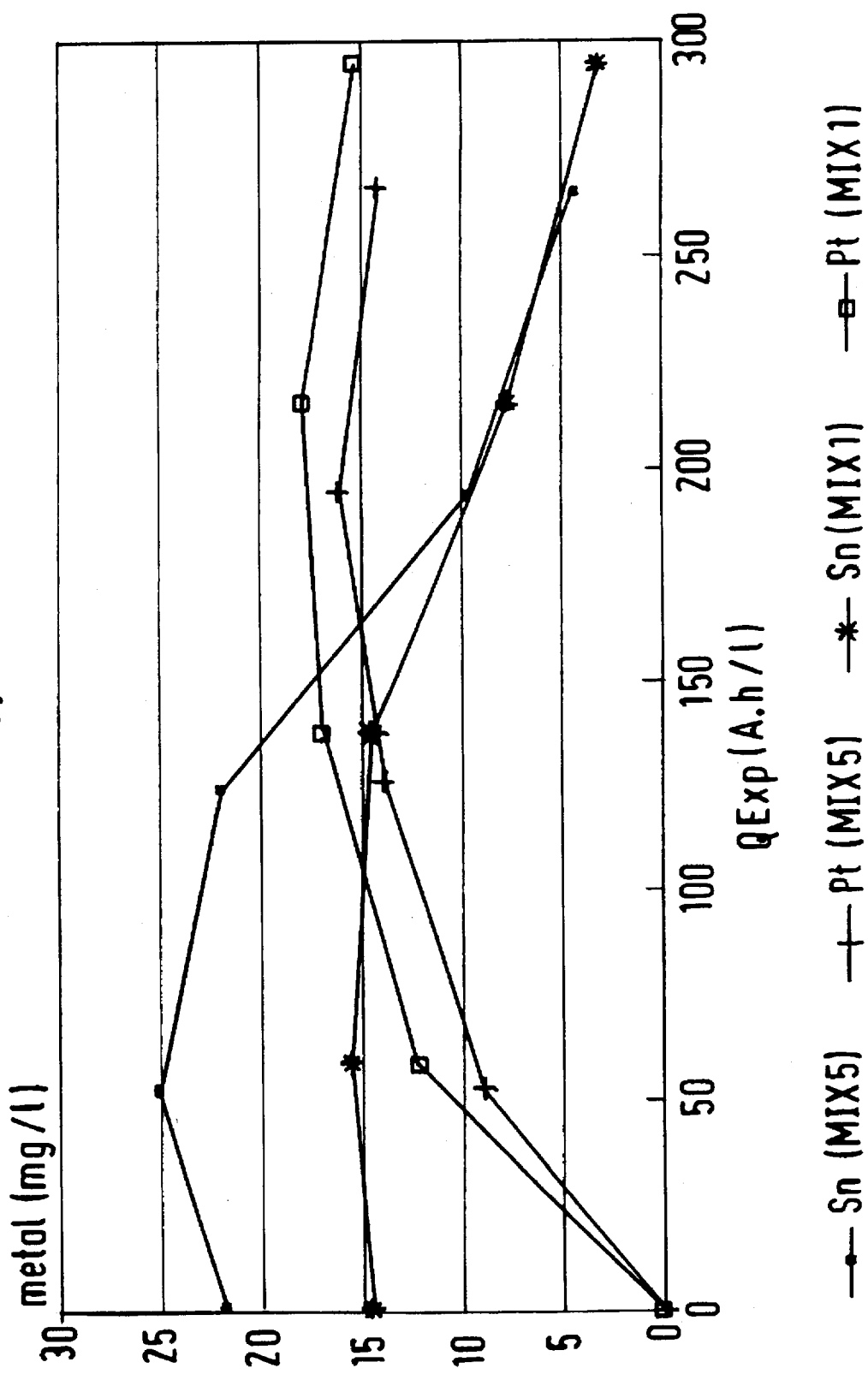
FIG. 5 which represents the concentrations of platinum and tin in solution as a function of the quantity of electricity for the mixtures of developers 1 and 5.

FIG. 5 shows the quantities of platinum and tin in solution for mixture 1 (MIX 1) and mixture 5 (MIX 5) respectively, as a function of the quantity of electricity. It can be seen that initially the platinum content of the solution increases, and then tends to decrease if electrolysis is carried out by depositing platinum on the cathode. It can be seen that approximately 70 and 80% respectively of the tin initially contained in mixtures 1 and 5 is extracted.

Table II contains the data relating to the initial COD ($COD_{init}$), the final COD ($COD_{fin}$), the quantity of current consumed in ampere-hours, the time over which the pH is regulated, expressed in hours and as a % of the total duration of the electrolysis, and the quantity of platinum and tin in solution.

TABLE II

|           | $COD_{init}$ (g/l) | $COD_{fin}$ (g/l) | Current quantity (A.h) | Reg. pH (h) (% time) | Pt (mg/l) | Sn (mg/l) |
|-----------|------|------|-----|-------------|------|------|
| Mixture 1 | 34.8 | 1.3  | 162 | 3.2 (19.8)  | 15.2 | 3.1  |
| Mixture 2 | 35.9 | 1.1  | 174 | 3.5 (20.1)  | 21.5 | 5.7  |
| Mixture 3 | 33.5 | 1.5  | 164 | 3.3 (20.1)  | 17.8 | 4.2  |
| Mixture 4 | 25.9 | 2.4  | 116 | 2.3 (19.8)  | 15.3 | 3.5  |
| Mixture 5 | 30.2 | 2.0  | 146 | 2.9 (19.9)  | 14.0 | 4.4  |

This table shows that it was possible to extract 38 to 80% of the tin contained in the mixture of developers. All the solutions obtained are clear and colorless and do not give off any unpleasant odor after treatment. The pH of the solutions after treatment is between 9.3 and 9.5.

EXAMPLE 3

(comparative)

In a compact electrolytic cell consisting of SHOWA expanded-metal titanium anodes covered with pure plating, and titanium cathodes, stacked in alternation, 1857 ml of developer coming from the expansion vessel is circulated parallel to the electrodes at the rate of 1400 ml/min. The current density is 3.33 A/dm$^2$. The electrolysis is performed in galvano-static mode, the current intensity being set at 34A and the corresponding voltage varying between 3 and 6 volts. The temperature is maintained at 25° C. If required, the pH is regulated at 11 by adding concentrated nitric acid or soda. 0.03 ml/l of pure Pluronic-31R1 Polyol® antifoaming agent and, where necessary, identical complementary additives, are introduced at the start of electrolysis. The mixture of developers subjected to electro-oxidation is as follows:

Mixture 6: 5 l of E6CD, 10 l of E6BW, 8 l of R3CD, 8 l of R3BW.

Figure 6:
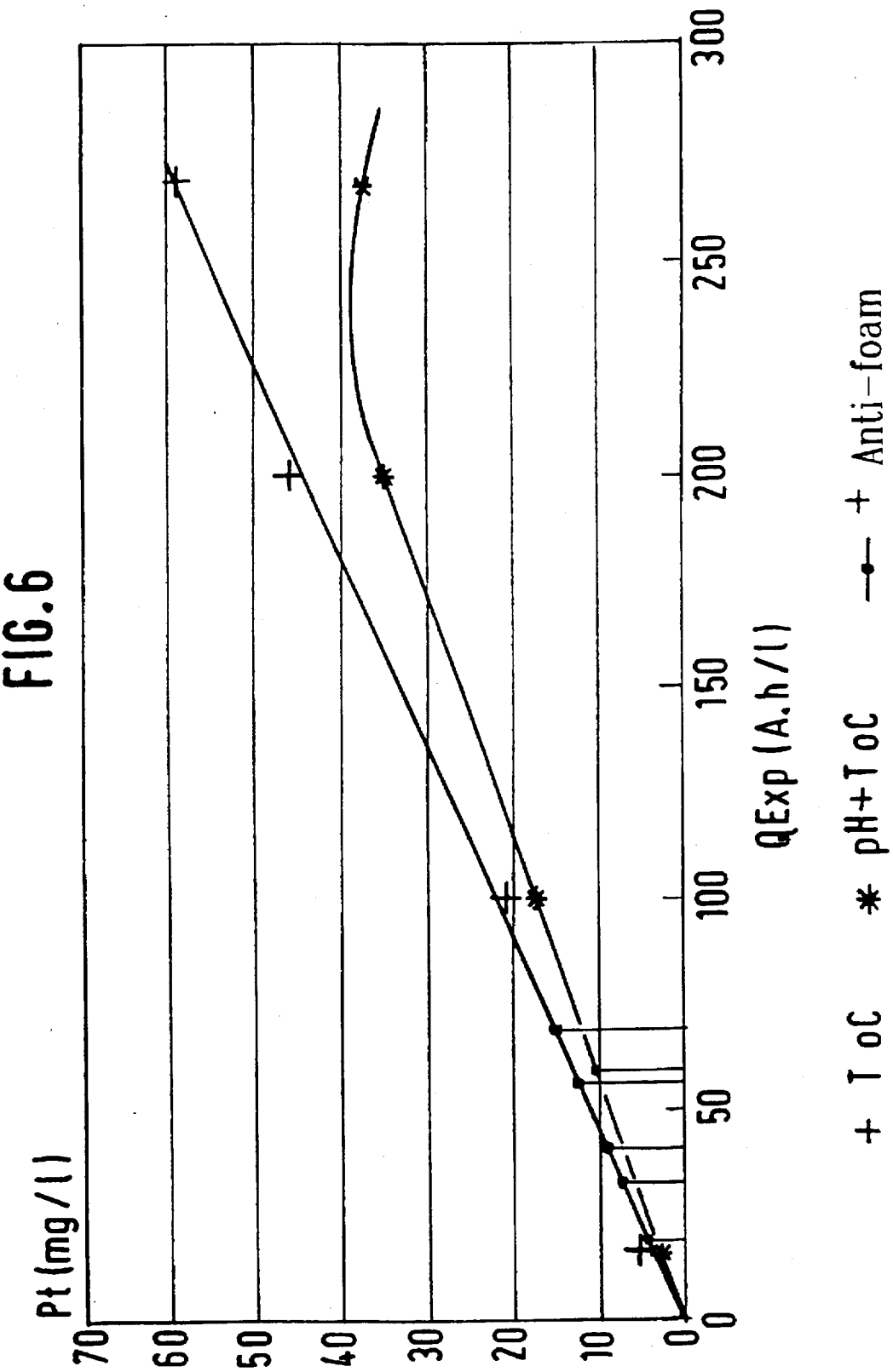
FIG. 6 which represents the concentration of platinum in solution as a function the quantity of electricity for the mixture of developers 6 with pH regulation and without pH regulation.

FIG. 6 shows the quantities of platinum in solution for mixture 6 as a function of the quantity of electricity, without pH regulation (T° C.) and with pH regulation (pH+T° C.), the temperature being kept constant in both cases. It can be seen that, without pH regulation, a quantity of antifoaming agent three times greater was ultimately necessary in order to control the volume of foam formed. The platinum content of the solution rises rapidly and does not tend to fall if the electrolysis is continued.

On the other hand, with pH regulation, the platinum content of the solution increases more slowly and stabilizes. As before, if the electrolysis had been continued, it would have fallen through deposition of the platinum on the cathode. For a quantity of electricity of 250 A.h/l, the quantity of platinum in solution without pH regulation is 59% higher than with pH regulation.

I claim:

1. A process for the electrooxidation of a photographic solution comprising one or more used non-diluted developer, the process comprising the step of:
   (a) electro-oxidating the photographic solution in a single compartment electrolytic cell comprising at least one platinum anode and at least one cathode, and
   (b) maintaining the pH of the photographic solution constant at a value above or equal to 10.5 from the start of the electro-oxidation to 10 to 25% of the total electrolysis time, and
   (c) introducing an antifoaming agent in an amount less than the amount required for preventing foam formation when pH is not maintained constant.

2. Process according to claim 1 in which the electrolysis is carried out at a pressure close to atmospheric pressure.

3. Process according to claim 1 in which the electrolysis is carried out at a temperature between 20° and 30° C.

4. Process according to claim 3 in which the electrolysis is carried out at a temperature close to 25° C.

5. Process according to claim 1 in which an antifoaming agent is introduced either at the start of the electrolysis or as soon as the presence of foam is detected.

6. Process according to claim 5 in which the antifoaming agent is a non-ionic surfactant.

7. Process according to claim 1 in which the photographic solution comprises one or more used black and white and/or color developers having a COD greater than 10 g/l.

* * * * *